(12) United States Patent
Poulos et al.

(10) Patent No.: US 9,952,656 B2
(45) Date of Patent: Apr. 24, 2018

(54) PORTABLE HOLOGRAPHIC USER INTERFACE FOR AN INTERACTIVE 3D ENVIRONMENT

(71) Applicant: Microsoft Technology Licensing, LLC, Redmond, WA (US)

(72) Inventors: Adam Gabriel Poulos, Sammamish, WA (US); Cameron Graeme Brown, Bellevue, WA (US); Aaron Daniel Krauss, Snoqualmie, WA (US); Marcus Ghaly, Kirkland, WA (US); Michael Thomas, Redmond, WA (US); Jonathan Paulovich, Redmond, WA (US); Daniel Joseph McCulloch, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/832,961

(22) Filed: Aug. 21, 2015

(65) Prior Publication Data

US 2017/0052507 A1    Feb. 23, 2017

(51) Int. Cl.
*G06T 19/00* (2011.01)
*G06F 3/00* (2006.01)
(Continued)

(52) U.S. Cl.
CPC .............. *G06F 3/00* (2013.01); *G06T 19/006* (2013.01); *G02B 2027/0141* (2013.01);
(Continued)

(58) Field of Classification Search
None
See application file for complete search history.

(56) References Cited

U.S. PATENT DOCUMENTS

| 8,994,721 B2 | 3/2015 | Matsuda |
| 2003/0032484 A1 | 2/2003 | Ohshima et al. |

(Continued)

FOREIGN PATENT DOCUMENTS

WO    2012112401 A2    8/2012

OTHER PUBLICATIONS

"Augmented Reality Systems Set to Revolutionise Battlefield Operations", Published on: May 11, 2015 Available at: http://www.baesystems.com/news-&-features-rzz/news/augmented-reality-systems-set-to-revolutionise-battlefield-operations.

(Continued)

*Primary Examiner* — Matthew Salvucci
(74) *Attorney, Agent, or Firm* — Arent Fox LLP

(57) ABSTRACT

Disclosed are a method and corresponding apparatus to enable a user of a display system to manipulate holographic objects. Multiple holographic user interface objects capable of being independently manipulated by a user are displayed to the user, overlaid on a real-world view of a 3D physical space in which the user is located. In response to a first user action, the holographic user interface objects are made to appear to be combined into a holographic container object that appears at a first location in the 3D physical space. In response to the first user action or a second user action, the holographic container object is made to appear to relocate to a second location in the 3D physical space. The holographic user interface objects are then made to appear to deploy from the holographic container object when the holographic container object appears to be located at the second location.

17 Claims, 14 Drawing Sheets

(51) Int. Cl.
*G03H 1/22* (2006.01)
*G03H 1/00* (2006.01)
*G02B 27/01* (2006.01)

(52) U.S. Cl.
CPC ............... *G02B 2027/0174* (2013.01); *G02B 2027/0178* (2013.01); *G02B 2027/0187* (2013.01); *G03H 1/2249* (2013.01); *G03H 2001/0061* (2013.01); *G03H 2001/2284* (2013.01)

(56) References Cited

U.S. PATENT DOCUMENTS

| | | |
|---|---|---|
| 2004/0104935 A1 | 6/2004 | Williamson et al. |
| 2010/0208033 A1 | 8/2010 | Edge et al. |
| 2012/0113223 A1 | 5/2012 | Hilliges et al. |
| 2013/0083018 A1 | 4/2013 | Geisner et al. |
| 2014/0004485 A1 | 1/2014 | Younkin et al. |
| 2014/0049559 A1 | 2/2014 | Fleck et al. |
| 2014/0162224 A1* | 6/2014 | Wallace .................. G09B 5/06 434/219 |
| 2014/0282008 A1 | 9/2014 | Verard et al. |
| 2014/0333666 A1* | 11/2014 | Poulos .................. G06T 19/006 345/633 |
| 2014/0347391 A1 | 11/2014 | Keane et al. |
| 2016/0026253 A1* | 1/2016 | Bradski ................ G02B 27/225 345/8 |
| 2016/0179336 A1* | 6/2016 | Ambrus ............... G02B 27/017 715/768 |

OTHER PUBLICATIONS

"Microsoft's HoloLens launches us into a Future of Holographic Computing", Published on: Jan. 21, 2015 Available at: http://trendytechie.ca/2015/01/21/microsofts-hololens-launches-us-into-a-future-of-holographic-computing/.

Otsuki, et al., "Novel Interaction Methods with Mixed Reality Space", In Proceedings of International Conference on Instrumentation, Control and Information Technology, Aug. 20, 2008, pp. 456-460.

\* cited by examiner

PORTABLE HOLOGRAPHIC USER INTERFACE FOR AN INTERACTIVE 3D ENVIRONMENT

BACKGROUND

Virtual reality (VR) and augmented reality (AR) visualization systems are starting to enter the mainstream consumer electronics marketplace. AR Head-Mounted Display (HMD) devices ("AR-HMD devices") are one promising use of such technology. These devices may include transparent display elements that enable a user to see virtual content transposed over the user's view of the real world. Virtual content that appears to be superimposed over the user's real-world view is commonly referred to as AR content. Displayed AR objects are often referred to as "holographic" objects. VR and AR visualization systems can provide users with entertaining, immersive three-dimensional (3D) virtual environments in which they can visually (and sometimes audibly) experience things they might not normally experience in real life.

SUMMARY

The techniques introduced here enable a user of a display system to manipulate holographic objects. In some embodiments, the technique is implemented in an HMD device. In some embodiments, multiple holographic user interface objects capable of being independently manipulated by a user of an HMD device are displayed to the user, overlaid on a real-world view of a 3D physical space in which the user is located. In response to a first user action, the holographic user interface objects are caused to appear to be combined into a holographic container object that appears at a first location in the 3D physical space. In response to the first user action or a second user action, the holographic container object is caused to appear to relocate to a second location in the 3D physical space. The holographic user interface objects are then caused to appear to deploy from the holographic container object when the holographic container object appears to be located at the second location in the 3D physical space.

Other aspects of the technique will be apparent from the accompanying figures and detailed description.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

In this description, references to "an embodiment," "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Unlike with traditional two-dimensional (2D) visual applications that are limited to a 2D screen on a computer, tablet or smartphone device, objects in a holographic application appear to have 3D positions in the real world. This characteristic introduces a potential problem that holographic objects, particularly holographic graphical user interface (GUI) objects, can become difficult for the user to find or otherwise interact with. For example, a user of an AR-HMD device might open a holographic menu in an application while standing in his kitchen at home, and then walk into his living room. The holographic application may or may not be capable of making the menu follow him around the home; if it is not, the user may or may not remember that he left the menu back in the kitchen. As another example, the user might start changing settings for a holographic object, walk away, and then have difficulty reading the text on the holographic object settings from across the room.

In accordance with the techniques introduced here, these and other problems can be solved by a holographic application that provides a portable holographic user interface. The portable holographic user interface can include, for example, a holographic toolbox (as henceforth assumed herein to facilitate description), suitcase, or other similar container object, that visually and functionally includes one or more additional user interface elements. In this description, a user interface element/object or tool is a displayable object that has some user-accessible function associated with it.

For example, upon starting the holographic application in an AR-HMD device, the user might "drop" the holographic toolbox in a particular room, and it would unfold or expand into a holographic GUI of tools and objects that a user can use to create and/or modify other holographic objects. If the user wants to move the toolbox for any reason, he can enter a simple user input to pack up the toolbox (e.g., by using a hand gesture to select the handle of the toolbox) and move the entire user interface to a new location. In some embodiments, the holographic toolbox (or other portable holographic user interface) will automatically follow the user around and/or will automatically maintain the same relative position and orientation relative to the user, as the user moves around.

These and other techniques are described further below. First, however, it is useful to describe an example of an environment and a device in which these techniques can be implemented.

Figure 1:
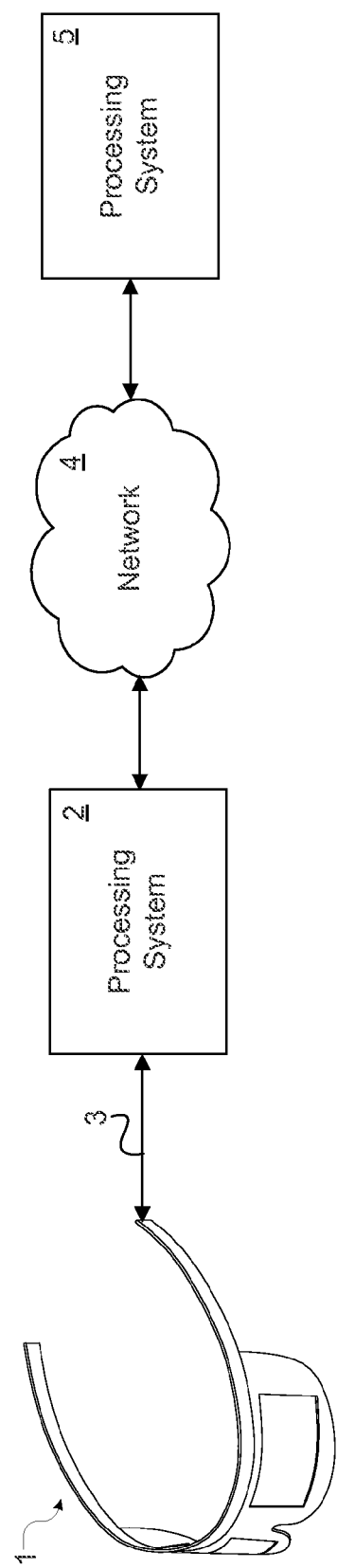
FIG. 1 illustrates an example of an environment including an AR-HMD device.

FIG. 1 shows an example of an environment including an AR-HMD device 1 that can implement the techniques introduced here. In the illustrated example, the AR-HMD device 1 is configured to communicate data to and from an external processing device 2 through a connection 3, which can be a wired connection, a wireless connection, or a combination thereof. In other use cases, however, the AR-HMD device 1 may operate as a standalone device. The connection 3 can be configured to carry any kind of data, such as image data (e.g., still images and/or full-motion video, including 2D and 3D images), audio data (including voice), multimedia, and/or any other type(s) of data. The processing device 2 may be, for example, a game console, personal computer, tablet computer, smartphone, or other type of processing device. The connection 3 can be, for example, a universal serial bus (USB) connection, Wi-Fi connection, Bluetooth or Bluetooth Low Energy (BLE) connection, Ethernet connection, cable connection, DSL connection, cellular connection (e.g., 3G, LTE/4G or 5G), or the like, or a combination thereof. Additionally, the processing device 2 may communicate with one or more other processing systems 5 via a network 4, which may be or include, for example, a local area network (LAN), a wide area network (WAN), an intranet, a metropolitan area network (MAN), the global Internet, or a combination thereof.

Figure 2:
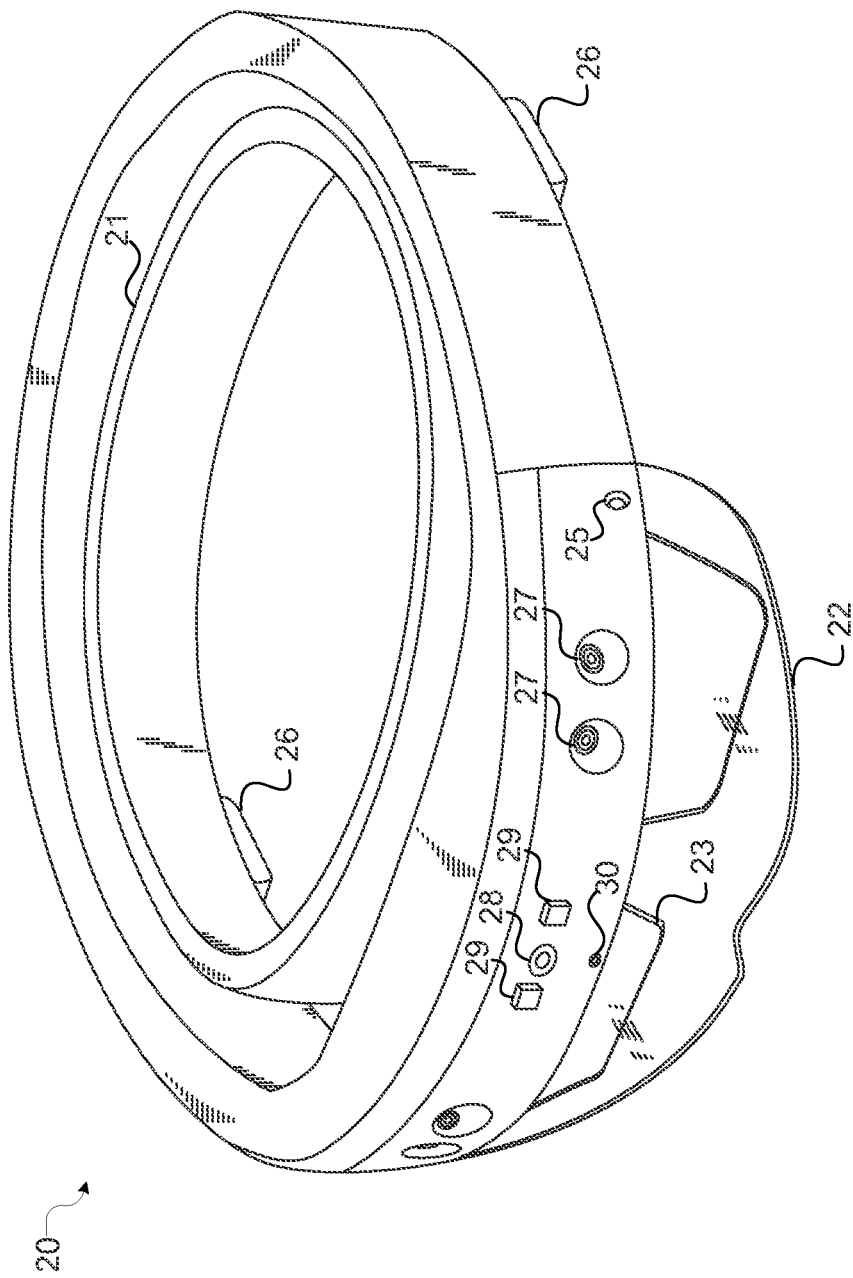
FIG. 2 shows a perspective view of an example of an AR-HMD device.

FIG. 2 shows a perspective view of an example of an AR-HMD device that can implement the techniques introduced here. The AR-HMD device 20 can be an embodiment of AR-HMD device 1 in FIG. 1. AR-HMD device 20 includes a head fitting, namely, a headband 21, by which the AR-HMD device 20 can be worn on the user's head. Attached to the headband 21 (directly or indirectly) is a transparent protective visor 22 that encloses one or more transparent AR display devices 23, each of which can overlay holographic images on the user's view of his real-world environment, for one or both eyes (e.g., by projecting light into the user's eyes). The protective visor 22 also encloses various circuitry (not shown) and sensors.

The AR-HMD device 20 further includes one or more eye-tracking cameras 24, one or more microphones 25 to input speech from the user (e.g., for use in recognizing voice commands and providing audio effects); one or more audio speakers 26 to output sound to the user; one or more visible-spectrum tracking cameras 27 for use in capturing images of surrounding surfaces to allow tracking of the user's head position and orientation in real-world space and hand gesture recognition; one or more infrared (IR) spectrum depth cameras 28 for use in determining distances to nearby surfaces (e.g., for use in surface reconstruction to model the user's environment); one or more IR illumination sources 29 for use with the depth camera(s) 28; and one or more visible spectrum video cameras 30 for use in capturing standard video of what the user sees. The AR-HMD device 20 also includes circuitry (not shown), which may be contained within the visor 22, to control at least some of the aforementioned elements and perform associated data processing functions (e.g., speech and gesture recognition and display generation). The circuitry may include, for example, one or more processors and one or more memories. Note that in other embodiments the aforementioned components may be located in different locations on the AR-HMD device 20. Additionally, some embodiments may omit some of the aforementioned components and/or may include additional components not mentioned above.

Figure 3:
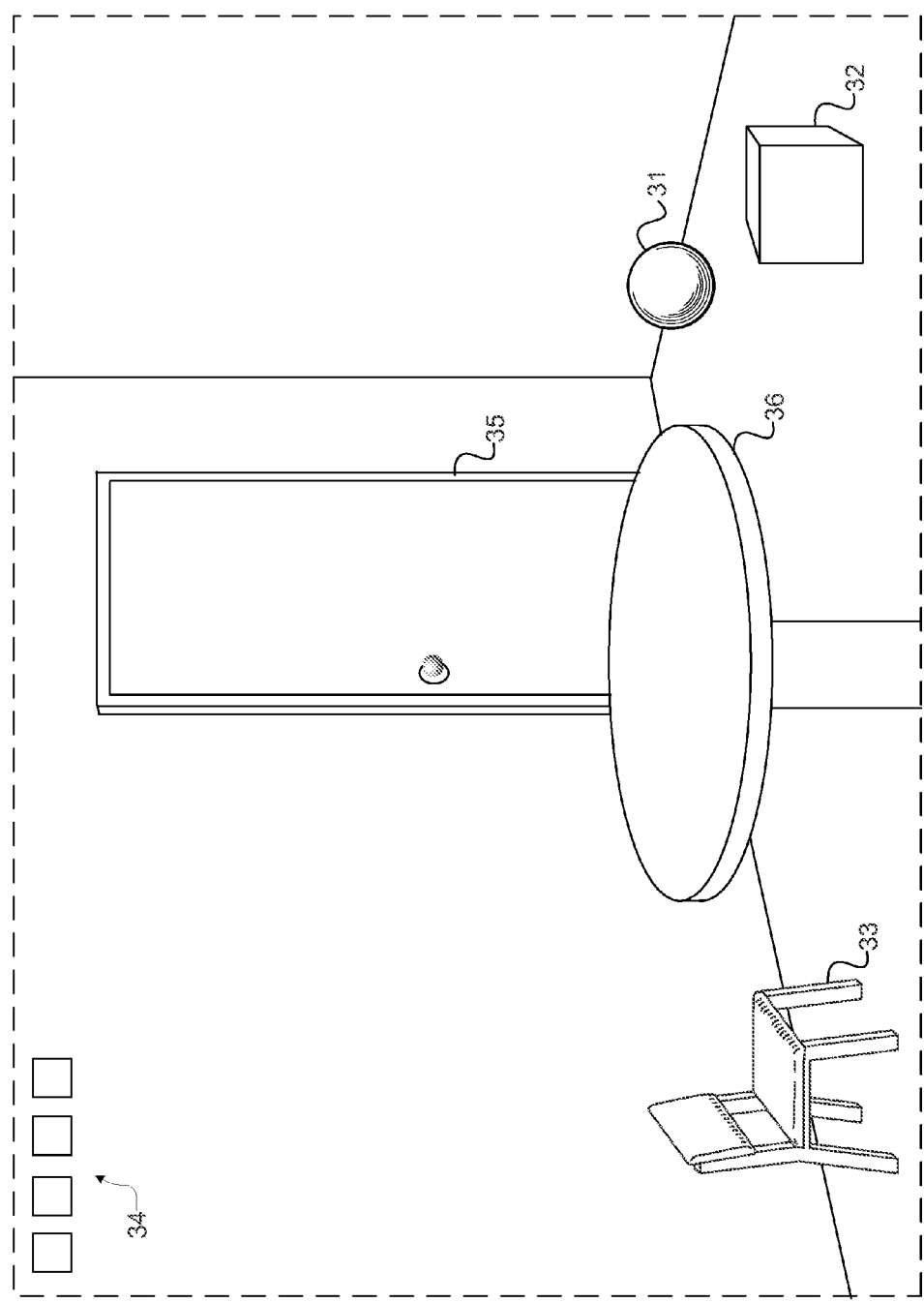
FIG. 3 shows an example of a view that a user of an AR-HMD device might have through the device, including various real and holographic objects.

FIGS. 3 through 9 show various examples of views that a user of an AR-HMD device (or any other device that provides an immersive 3D visualization) might have in connection with the techniques introduced here (e.g., through display devices 23 and visor 22 in FIG. 2). In particular, FIG. 3 shows an example of the view that a user of the AR-HMD device (such as AR-HMD device 20) might have while standing in a room while wearing the device. Through the display area of the device, the user may see various real-world objects, such as the floor and walls of the room, a chair 33, a door 35 and a table 36. The AR-HMD device may also display various holographic objects overlaid on the user's real-world view, such as a holographic ball 31 and/or a holographic cube 32. These are very simple examples of holographic objects to facilitate explanation; in practice a display system may enable the user to see and interact with much more complex holographic objects. Note that in some instances, the table 36 might be holographic rather than real (e.g., a holographic work surface on which to build other holographic objects). The AR-HMD device may also display one or more holographic icons 34 and/or other GUI elements in the user's field of view, to enable the user to use various functions of the AR-HMD device.

While the AR-HMD device is operational, it can use its depth camera(s) to construct a 3D mesh model of all surfaces in the user's vicinity (e.g., within several meters), or at least of all nearby surfaces within the user's field of view, including their distances from the user (i.e., from the AR-HMD device). Techniques for generating a 3D mesh model of nearby surfaces by using depth detection (e.g., time of flight) are known in the art and need not be described herein. Accordingly, the 3D mesh model in the example of FIG. 3 would model at least all visible surfaces of the chair 33, table 36 (assuming it is real and not holographic) and door 35 as well as the room's walls, floor and ceiling, windows, and potentially even smaller features such as curtains, artwork (not shown) mounted on the walls, etc. The 3D mesh model can be stored in memory on the AR-HMD device. By use of the 3D mesh model and image data from the visual tracking system, circuitry in the AR-HMD device can at any time determine the user's precise position within the room. The 3D mesh model can be automatically updated on a frequent basis, such as several times per second.

By using the AR-HMD device, and through the use of hand gestures, voice commands and/or controlled gaze, the user can create and manipulate various 3D holographic (AR) objects, such as sphere 31 and cube 32. For example, the user can create and delete holographic objects, move and rotate holographic objects, change colors, fill patterns, surface textures and decorations of holographic objects, etc. As shown, these objects are overlaid on the user's view of the real world.

Figure 4:
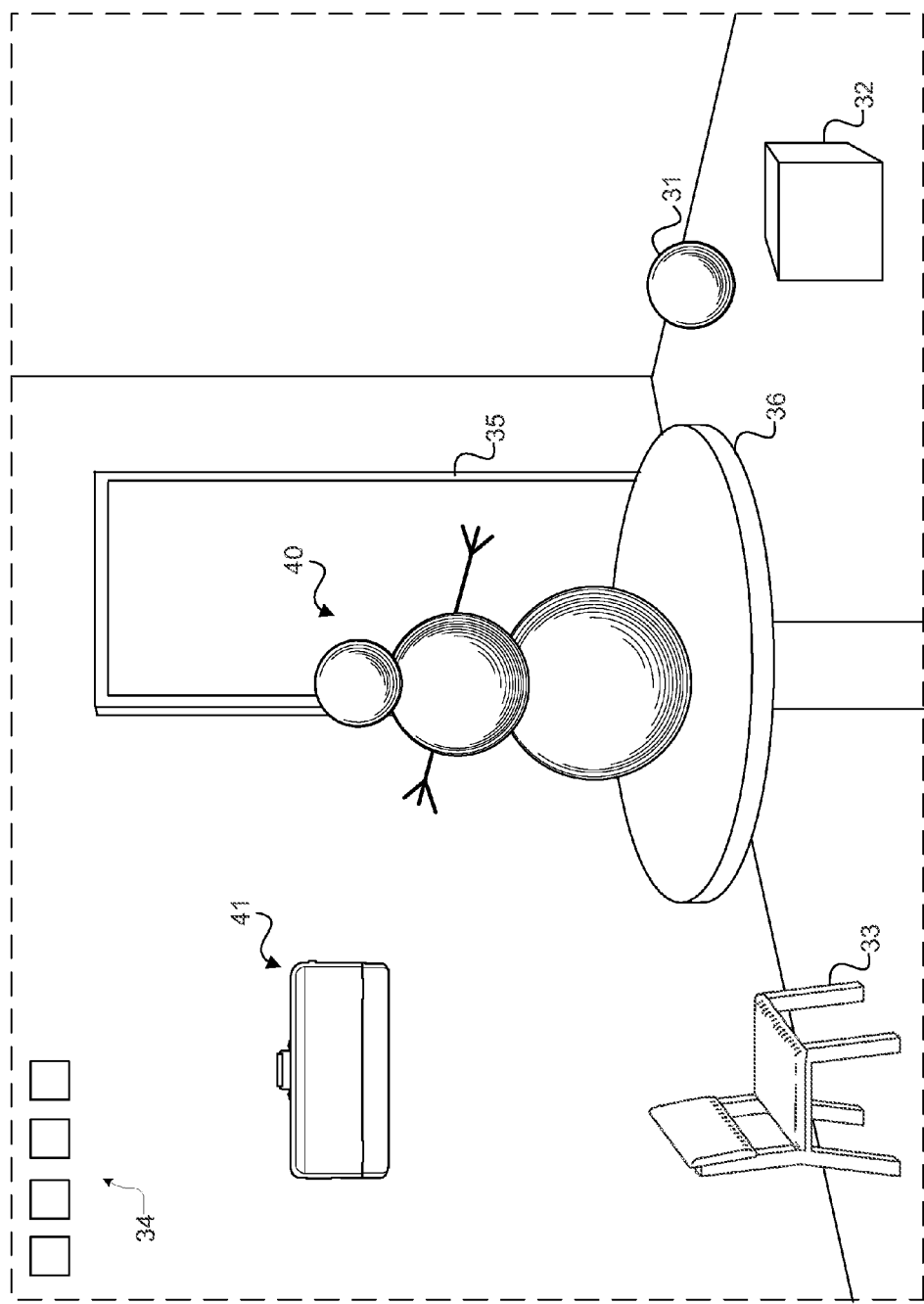
FIG. 4 shows an example of a view that the user might have through an AR-HMD device, including a holographic toolbox.

For example, the user may create a holographic object such as the snowman 40 shown in FIG. 4, which appears to be resting on the surface of the table 36. Note that a holographic object does not actually have a location in real (physical) space, since it is not a real object. However, in the context of this description, every holographic object has an apparent location in real space, which is the location in real space at which the object appears to be located to the user. For purposes of this description, therefore, any reference to the "location" of a holographic object should be understood to be referring to its apparent location to the user.

Figure 5A:
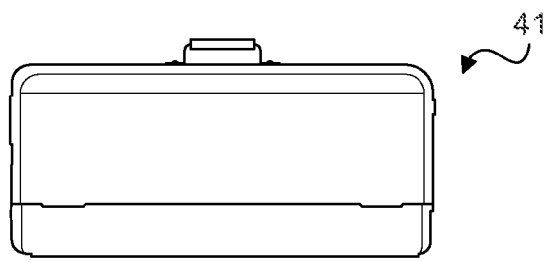
FIGS. 5A through 5E show representative images from an example of an animation sequence of a holographic toolbox opening and deploying its contents.
Figure 5B:
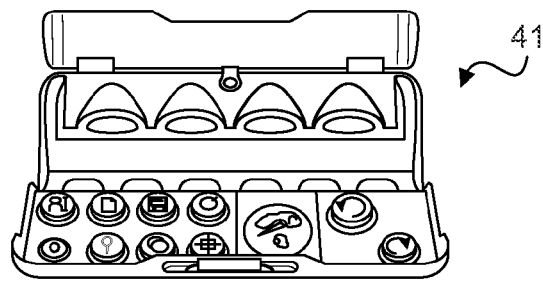
Figure 5C:
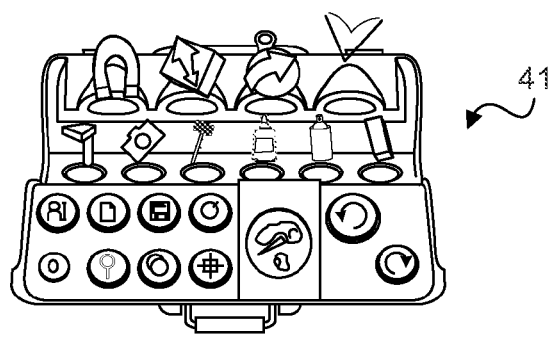
Figure 5D:
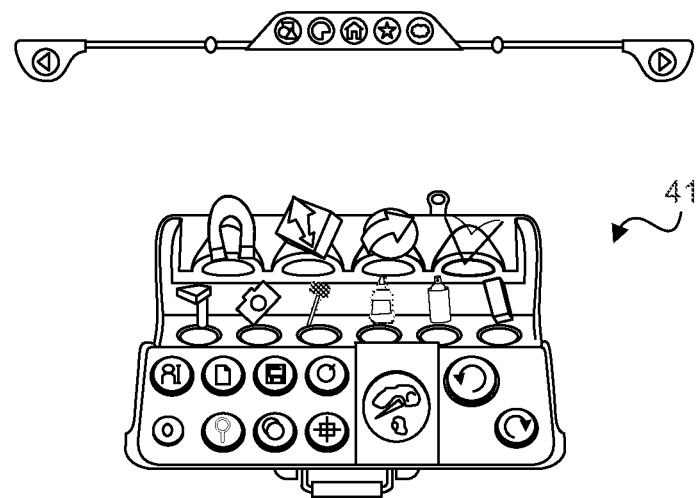

To assist the user in creating and editing holographic objects, a holographic application running on the AR-HMD device may provide a holographic user interface. In accordance with the techniques introduced here, the holographic user interface is portable, as described further below. The portable holographic user interface may be shown initially (i.e., upon startup of the holographic application) as a single holographic container object, such as holographic toolbox 41, as illustrated in FIGS. 4 and 5A, that "contains" one or more holographic tools, which appear to deploy from it in response to a predetermined input or inputs as shown in FIGS. 5B through 5E. Additionally or alternatively, the portable holographic user interface could have a different form, such as a simple menu, button, joystick, or a much more complex holographic object. The example of a toolbox is only used herein to facilitate description.

Upon startup of the application, the holographic toolbox 41 may appear to be closed, as shown in FIGS. 4 and 5A. Additionally, it may be displayed in any convenient location, such as floating in the air or stuck to a wall in front of the user. Preferably, the holographic toolbox 41 is displayed in a location where it does not obstruct the user's view of (occlude) other holographic objects.

Figure 5E:
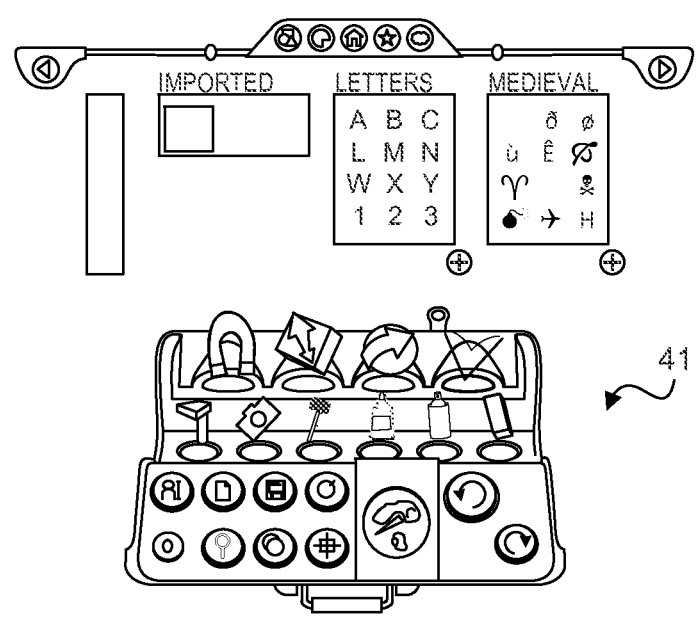
Figure 6:
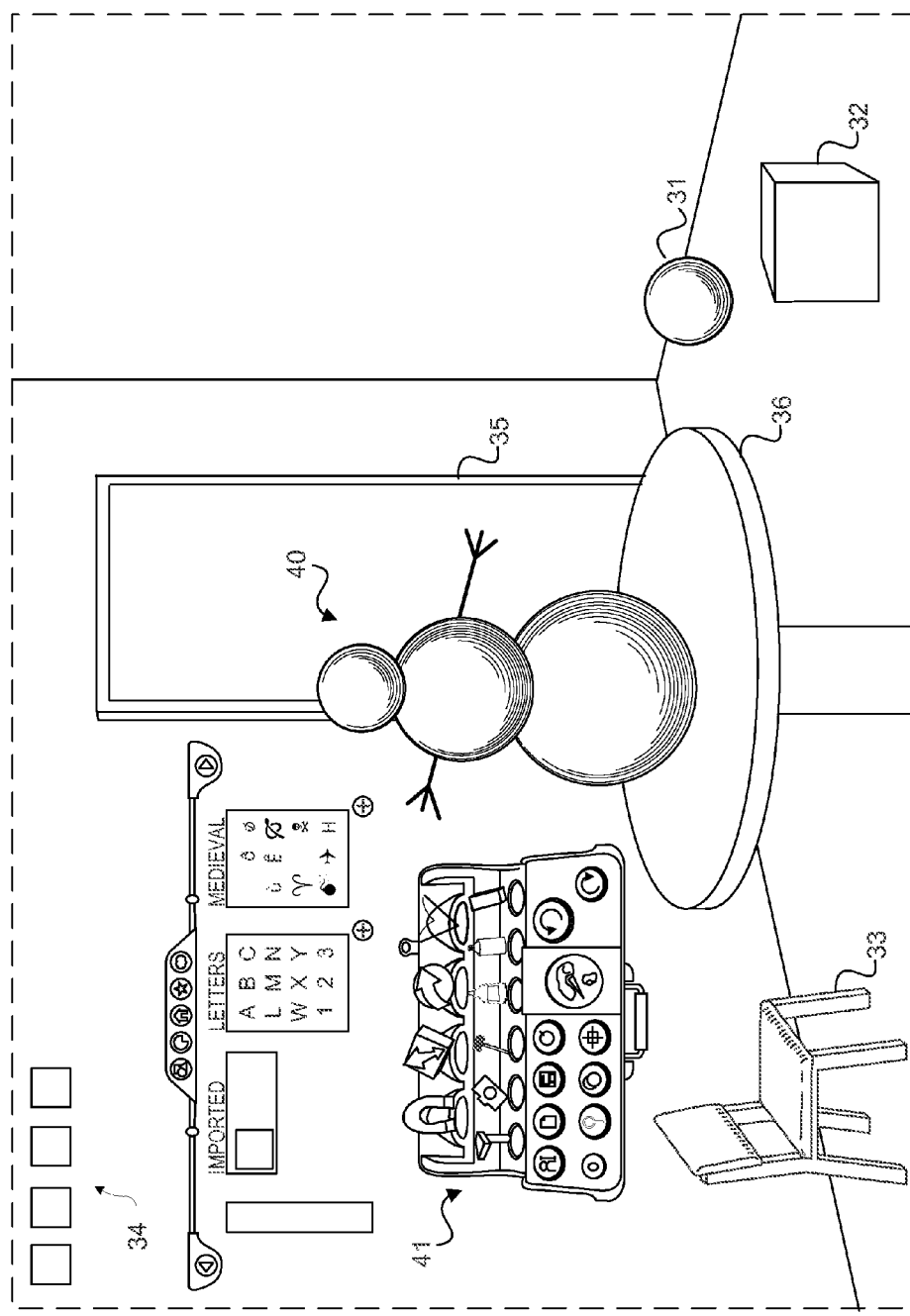
FIG. 6 shows a view similar to that of FIG. 3, but with the holographic toolbox fully opened and with its contents deployed.

The holographic application can then cause the holographic toolbox 41 to appear to open and deploy its contents, which are tools that the user can employ to create and edit other holographic objects. This may happen automatically, such as when the user speaks a predetermined command (e.g., "Toolbox"), uses a hand gesture to tap an icon, drops the toolbox 41 at a particular location in his 3D environment, or any other predetermined user input. FIGS. 5A through 5E show a sequence of images representing how the toolbox 41 may appear to open and deploy its contents. In some embodiments the deployment of objects from the toolbox 41 may appear to the user as a movie or animation. In other embodiments, it may be a sequence of discrete steps, each requiring a specific user input to trigger it. FIG. 6 shows an example how the toolbox 41 and its contents might appear when fully open and deployed. As shown in FIGS. 5E and 6, the toolbox 41 contains various different tools. These tools might include, for example: a magnet to pick up and move holographic objects; a spray paint can, crayon, marker and/or other similar tool(s) for decorating holographic objects; a glue bottle for sticking holographic objects together, an eraser for deleting object features, etc. Additionally, as shown in the illustrated example, the contents of the toolbox 41 might include various different alphanumeric characters and/or other characters and images, which can be applied to other holographic objects.

Figure 7:
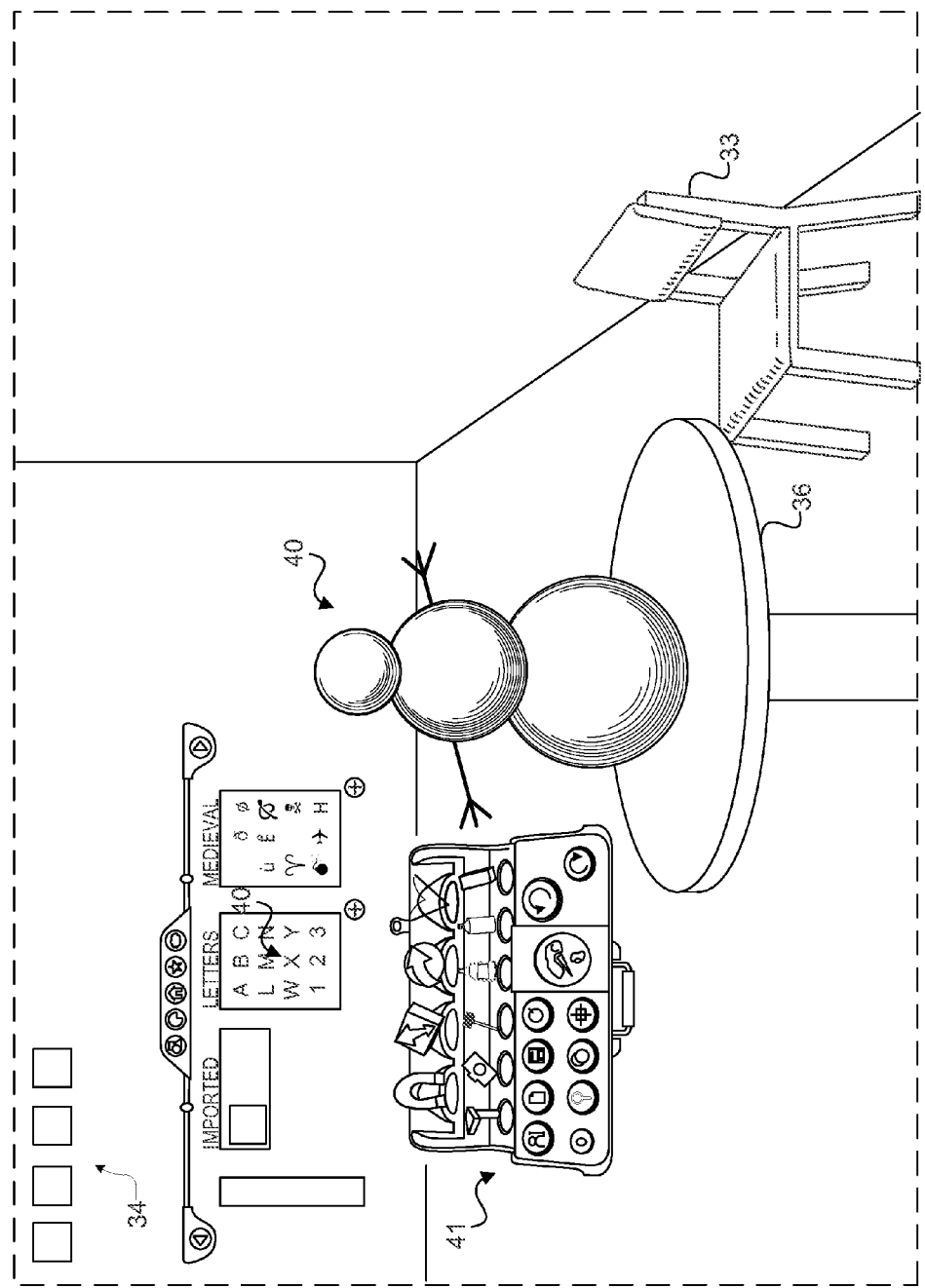
FIG. 7 shows a view similar to that of FIG. 6, but from a different viewing location of the user.
Figure 8A:
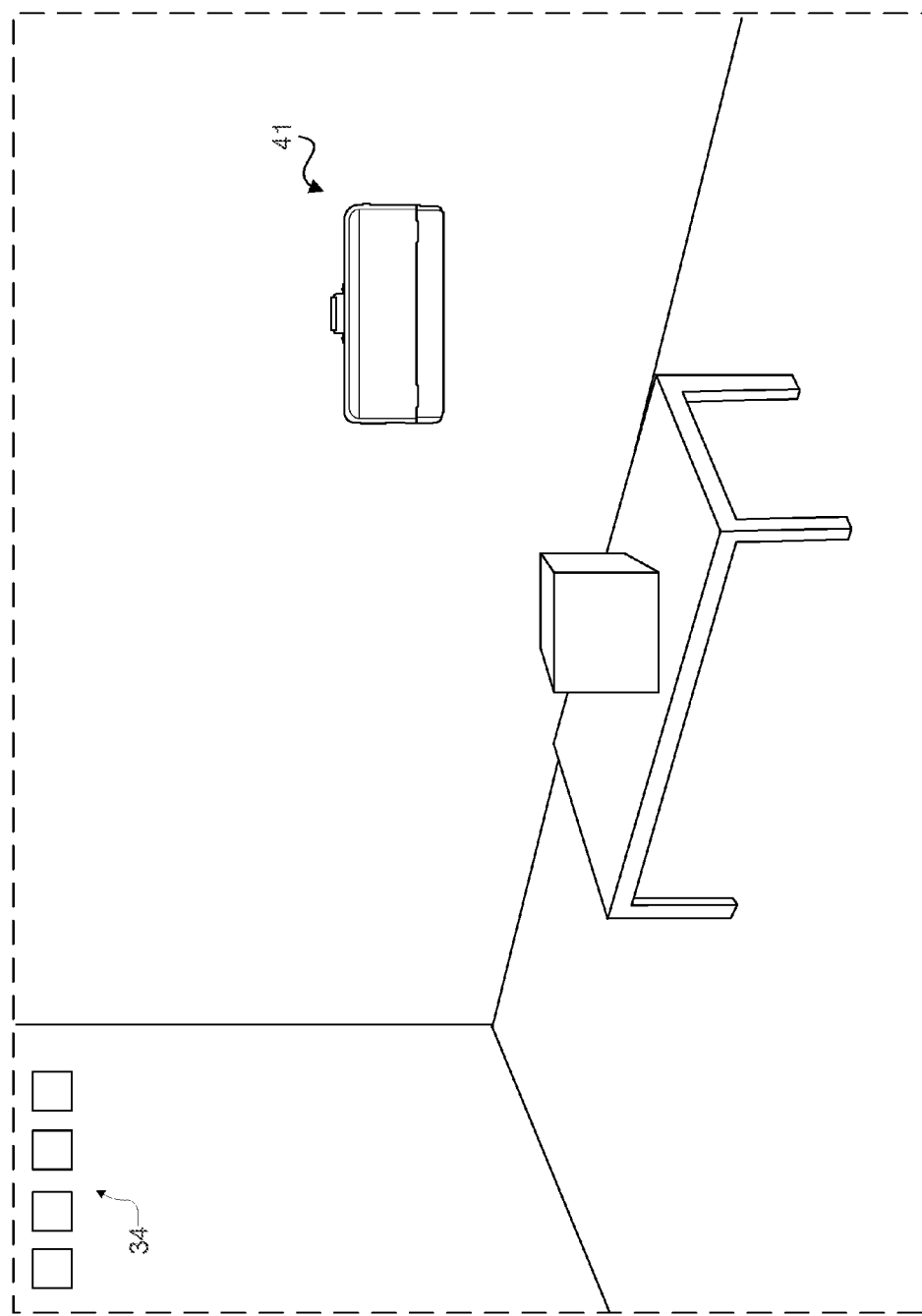
FIGS. 8A and 8B show an example of views that a user might have after moving the holographic toolbox to a new location.
Figure 8B:
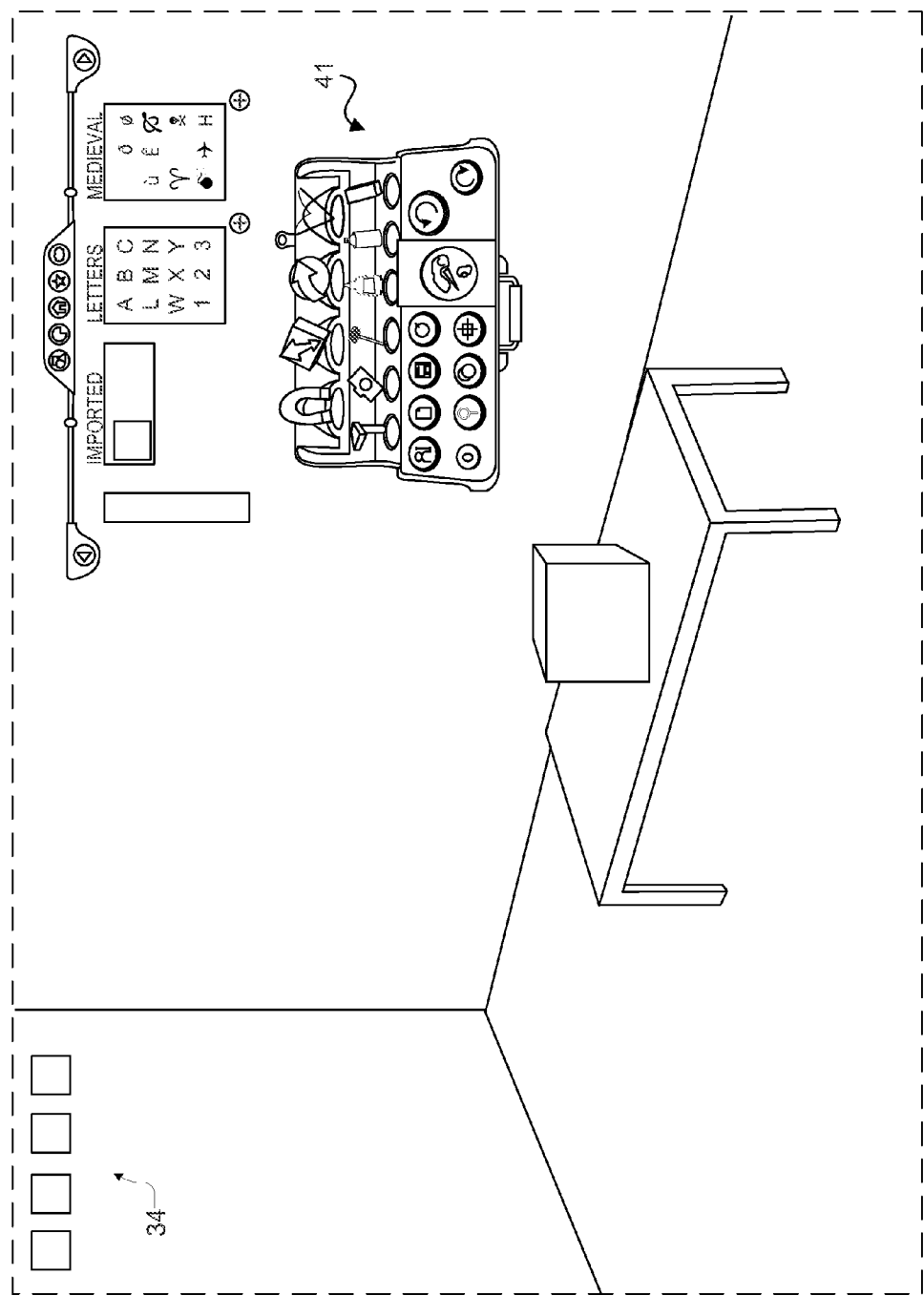

In some embodiments, the holographic application will cause the toolbox 41 to automatically follow the user around if the user walks away, and/or it will automatically maintain the same position and orientation of the toolbox 41 relative to the user as the user moves. For example, FIG. 7 shows an example of the view from the user's perspective after the user has walked partway around the table 36, relative to the perspective shown in FIG. 3: Note that the toolbox 41 in FIG. 7 appears in the same location, relative to the direction in which the user's head is pointing, as in FIG. 3. In some embodiments, if the user moves away from his current location by some predetermined amount, the holographic application will cause an animation sequence essentially reverse that of FIGS. 5A through 5E to be automatically displayed, i.e., to pack up and close the toolbox 41, and the toolbox 41 will then follow the user automatically. FIGS. 8A and 8B show how the toolbox 41 may be displayed and redeployed in the user's new location. In some embodiments, if the toolbox 41 is relocated by the user or is deactivated (e.g., when the user activates another GUI feature), the various tools deployed from the toolbox will automatically be displayed as returning to their original positions within the toolbox. This action may appear to the user as a movie or animation.

Performance of these functions may be made subject to certain conditions. For example, the displayed location of the toolbox 41 may be automatically adjusted as necessary to avoid obstructing the user's view of other holographic objects and/or to avoid having the toolbox 41 be occluded by other objects (real or holographic). Similarly, a portion of the deployed toolbox 41 may be collapsed to avoid visual occlusion. In some embodiments, the toolbox 41 may appear to remain stuck to a wall or other real object to assist the user in locating it, until and unless the user decides to move somewhere else.

In some embodiments, the user can pack up the toolbox 41 with a simple user input, such as by saying "close toolbox" or by a hand gesture to "touch" the handle of the toolbox 41. The user input will cause an animation sequence essentially reverse that of FIGS. 5A through 5E to be displayed, i.e., to pack up and close the toolbox 41. The user can then pick up the toolbox 41 (e.g., by a hand gesture), "carry" it to another location (e.g., another room), and open it up in the new location in the same manner as described above and illustrated in FIGS. 8A and 8B.

Figure 9:
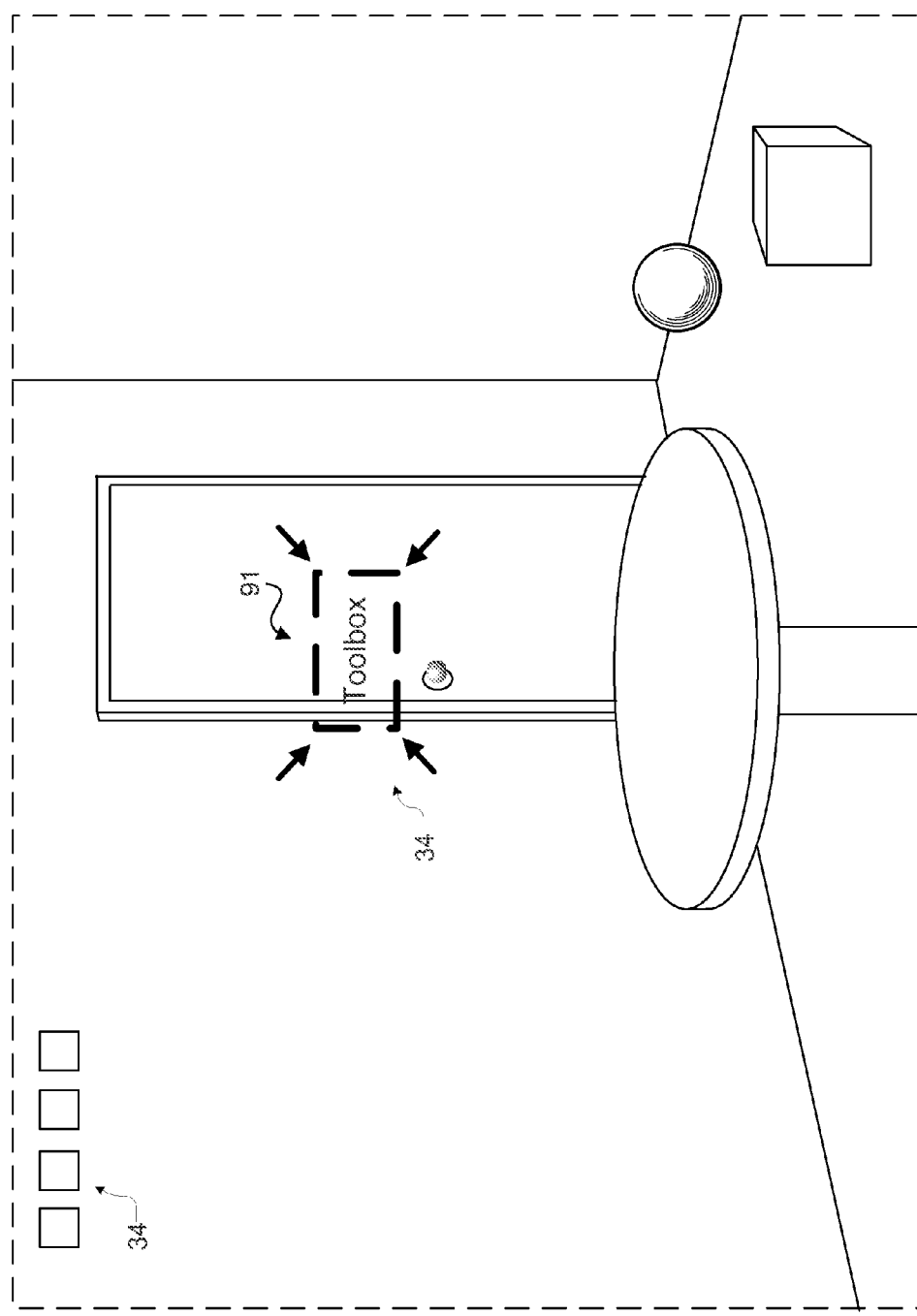
FIG. 9 shows an example of an indicator of the holographic toolbox's location when the holographic toolbox is not visible to the user.

In some embodiments, the holographic application provides visual cues to help the user find the toolbox 41 if the toolbox is not within the user's current field of view. For example, the application may cause the AR-HMD device to display directional arrows or other visual aids to indicate which way the user should turn to find the toolbox 41. If the toolbox is visually occluded by another object (real or holographic) (e.g., if it is on the other side of a wall or behind a sofa), the application might cause the AR-HMD to display a visual marker of the toolbox's location behind the object, such as a "ghost" toolbox 91, as shown in FIG. 9.

Figure 10:
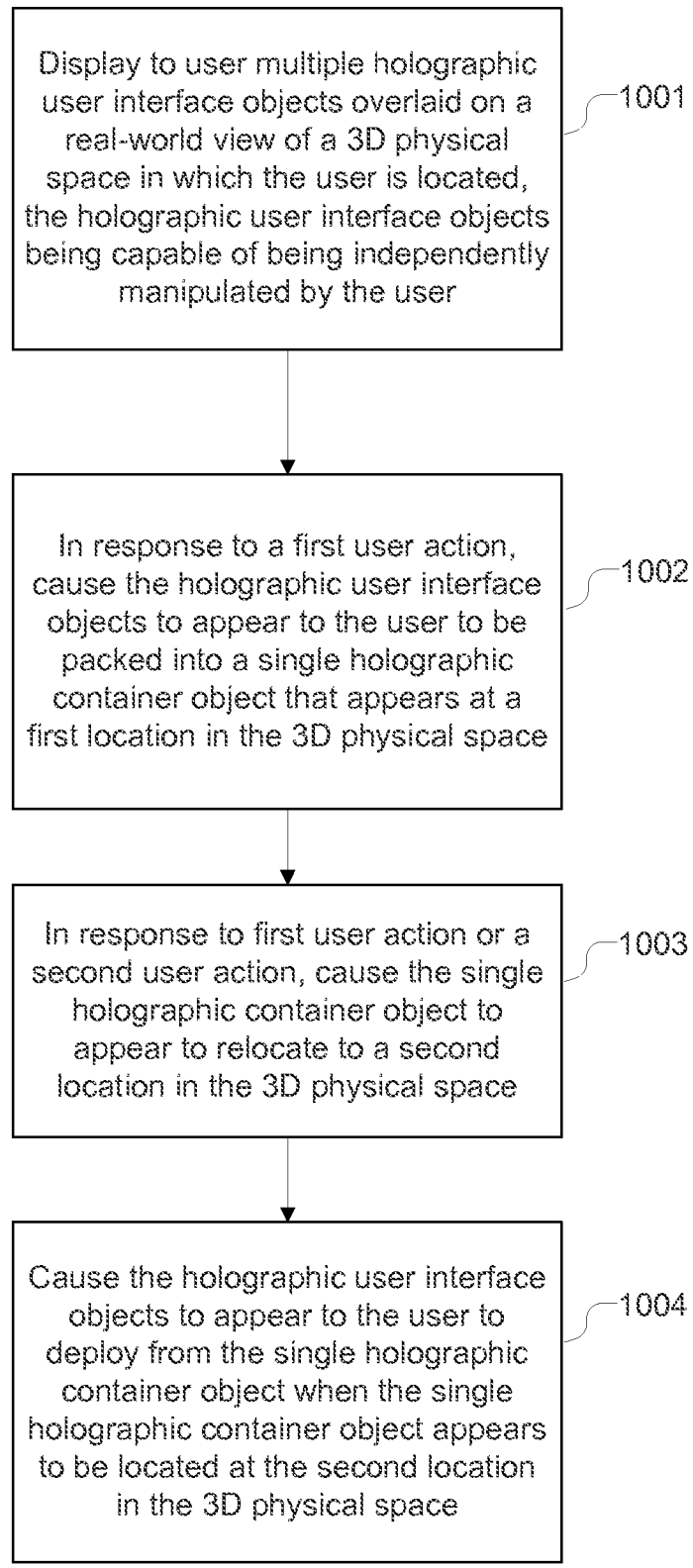
FIG. 10 shows an overall process for providing a portable holographic user interface.

FIG. 10 illustrates an overall process for providing a portable holographic user interface. The process can be performed by any display device or system that provides an immersive, interactive 3D visualization environment, such as an AR-HMD device. For example, the process can be performed by an application executing in such a device.

The process of FIG. 10 may begin after various holographic user interface objects (for example, holographic tools) have been deployed from a holographic container object, such as the toolbox 41 in FIGS. 6, 7 and 8B. Initially, at step 1001 the process displays to the user multiple holographic user interface objects overlaid on a real-world view of a 3D physical space in which the user is located. One example of such an arrangement of holographic objects is shown in FIG. 6, 7 or 8B, in the form of the deployed contents of the toolbox 41. The specific spatial arrangement of these objects relative to each other and to the user can be application-specific, user-configurable, and/or dependent on a prior state of the holographic application. The holographic user interface objects, which may be visual design tools, for example, are capable of being independently manipulated (e.g., used, invoked or operated) by the user. At step 1002, in response to a first prespecified user action, the process causes the holographic user interface objects to appear to the user to be combined (e.g., packed or stowed) into a single holographic container object (such as the above-described holographic toolbox 41) that appears at a first location in the 3D physical space. In some embodiments step 1002 may appear to the user as a movie or animation. For example, it could appear as the various tools and other contents of toolbox 41 automatically "flying" back into their appropriate storage positions within the toolbox 41, e.g., according to the reverse sequence of FIGS. 5A through 5E. The first prespecified user action may be, for example, an action expressly intended as a user input, such as a spoken command or hand gesture, or it may be an action that is not specifically intended as a user input, such as the user walking to another room. At step 1003, in response to the first prespecified user action or a second prespecified user action, the process causes the single holographic container object to appear to relocate to a second location in the 3D physical space. Thus, the relocation of the holographic container object in step 1003 may be automatic in response to the first prespecified user action, or it may be in response to a second prespecified user action that (like the first prespecified user action) may or may not be expressly intended as a user input. At step 1004, the process causes the holographic user interface objects to appear to the user to deploy from the single holographic container object when the single holographic container object appears to be located at the second location in the 3D physical space.

Figure 11:
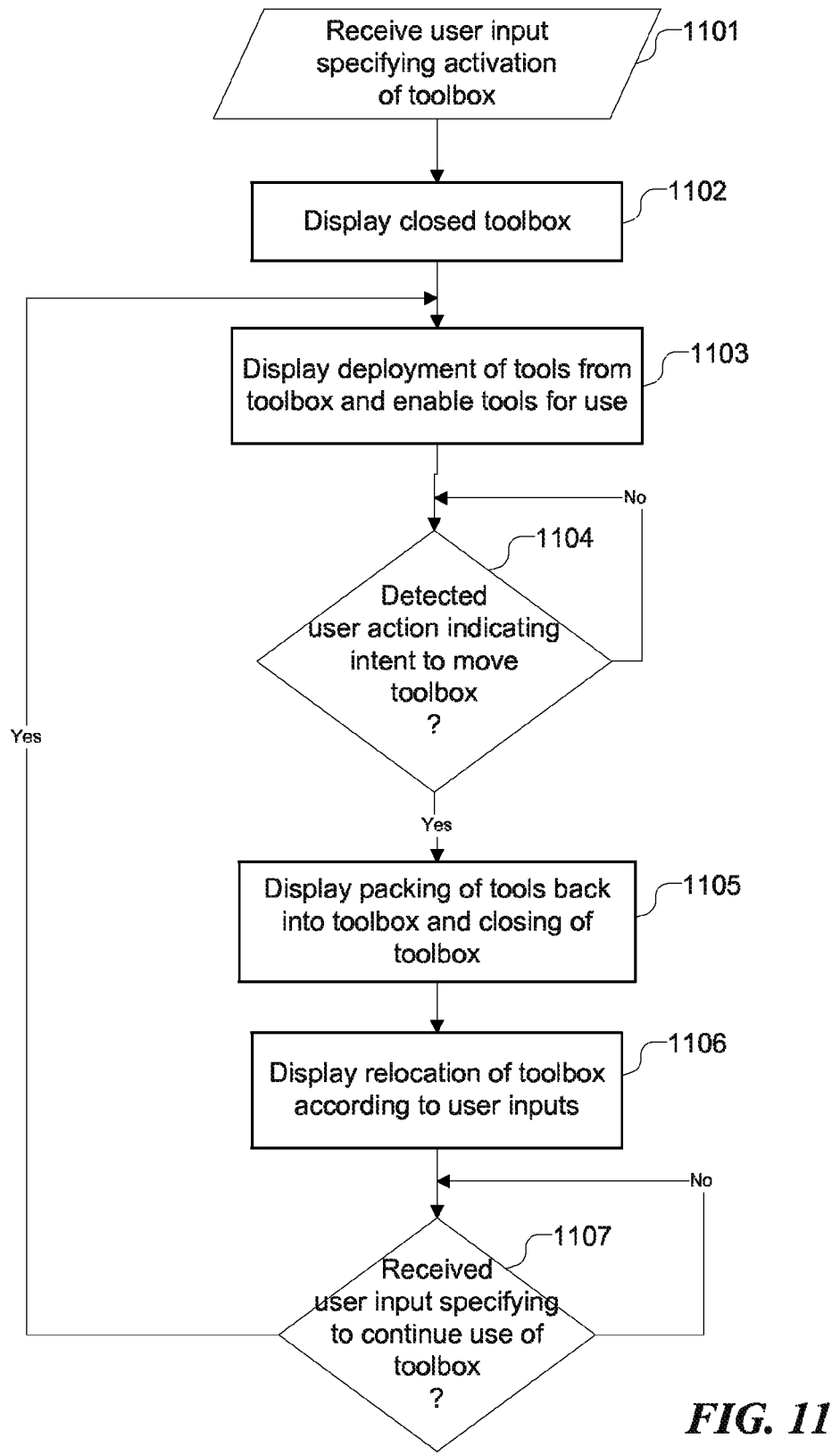
FIG. 11 shows an example of a specific implementation of the process of FIG. 10.

FIG. 11 illustrates a specific implementation of the process of FIG. 10, corresponding to the holographic toolbox example of FIGS. 3 through 7. At step 1101, the process receives a prespecified user input specifying activation of the holographic toolbox. As noted above, this input may be a predetermined spoken command, hand gesture, or any other suitable input. At step 1102, the process responds to that user input by displaying the closed holographic toolbox at a suitable location within the user's field of view. At step 1103 the process displays the deployment (e.g., as an animation) of various holographic GUI tools from the toolbox and enables the tools for use by the user.

If and when the process detects a prespecified user action that indicates (expressly or implicitly) an intent to move the toolbox (step 1104), the process responds at step 1105 by displaying (e.g., as an animation) the packing of the tools back into toolbox and closing of the toolbox. The process then displays relocation of the (closed) toolbox according to one or more user actions, which may or may not be expressed user inputs. The process then waits (step 1107) to receive prespecified user input specifying to continue use of toolbox (e.g., the spoken command, "open toolbox," or a hand gesture touching the handle of the toolbox), at which point the process loops back to step 1103, described above.

Alternatively, instead of waiting for user input at step 1107, the process could immediately loop back from step 1106 to step 1103. For example, in one possible use scenario, the user grabs the holographic toolbox and rotates his head to indicate intent to move the toolbox onto a real-world table. In response, the holographic toolbox immediately collapses, moves, then re-expands once the user's head movement has slowed down. This approach takes advantage of the user's natural inclination to slow down his head motion once he has successfully looked at the target location in the real world.

Of course, many different variations of the above-described approaches are possible.

Figure 12:
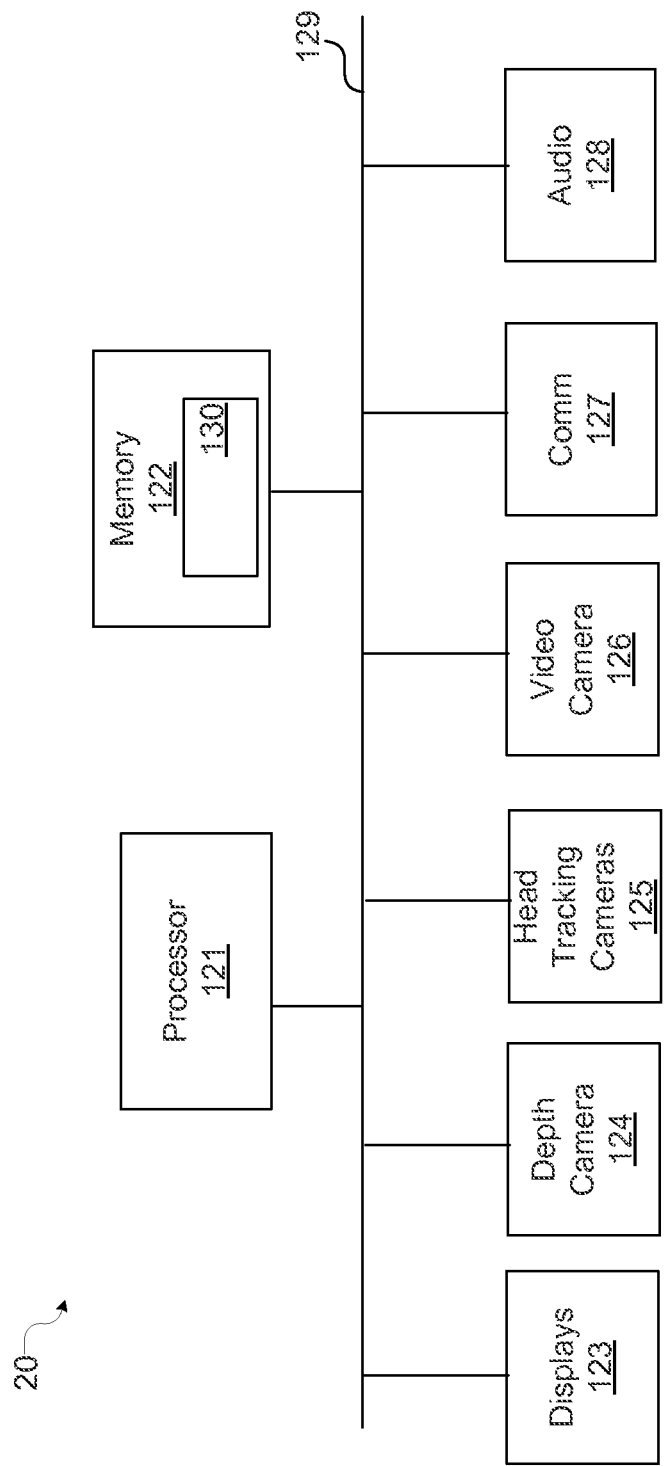
FIG. 12 is a block diagram showing an example of various functional components of an AR-HMD device.

FIG. 12 shows an example of various functional components of the AR-HMD device 20, according to some embodiments. In FIG. 12, the functional components of the AR-HMD device 20 includes one or more instance of each of the following: a main processor 121, memory 122, transparent display device 123, depth camera 124, head tracking cameras 125, video camera 126, communication device 127, and audio subsystem 128, all coupled together (directly or indirectly) by an interconnect 129. The interconnect 129 may be or include one or more conductive traces, buses, point-to-point connections, controllers, adapters, wireless links and/or other conventional connection devices and/or media, at least some of which may operate independently of each other.

The main processor(s) 121 individually and/or collectively control the overall operation of the AR-HMD device 20 and perform various data processing functions. For example, the processor(s) 121 may provide or at least support the portable holographic user interface features described above. Each processor 121 can be or include, for example, one or more general-purpose programmable microprocessors, digital signal processors (DSPs), graphics processing unit (GPU), mobile application processors, microcontrollers, application specific integrated circuits (ASICs), programmable gate arrays (PGAs), or the like, or a combination of such devices.

Data and instructions (code) 130 that configure the processor(s) 121 to execute aspects of the technique introduced here can be stored in the one or more memories 122. Each memory 122 can be or include one or more physical storage devices, which may be in the form of random access memory (RAM), read-only memory (ROM) (which may be erasable and programmable), flash memory, miniature hard disk drive, conventional hard disk drive, or other suitable type of storage device, or a combination of such devices.

The depth camera(s) 124 can apply time-of-flight principles, for example, to determine distances to nearby objects. The distance information acquired by the depth camera 124 is used (e.g., by processor(s) 121) to construct a 3D mesh model of the surfaces in the user's environment. The head tracking camera(s) 125 enable the AR-HMD device 20 to continuously track the current location and orientation of the user's head by acquiring images of the user's real-world environment. At least some of the functionality associated with surface detection and head tracking may be performed by the processor(s) 121.

The communication device(s) 127 enable the AR-HMD device 20 to receive data and/or commands from, and send data and/or commands to an external processing system, such as a personal computer or game console, although in at least some embodiments the AR-HMD device 20 can operate as a standalone device. Each communication device 127 can be or include, for example, a universal serial bus (USB) adapter, Wi-Fi transceiver, Bluetooth or Bluetooth Low Energy (BLE) transceiver, Ethernet adapter, cable modem, DSL modem, cellular transceiver (e.g., 3G, LTE/4G or 5G), baseband processor, or the like, or a combination thereof. The audio subsystem 128 includes at least one speaker and audio processing circuitry to output sound effects to the user.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software to implement the techniques introduced here may be stored on a non-transitory machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Examples of Certain Embodiments

Certain embodiments of the technology introduced herein are summarized in the following numbered examples:

1. A method comprising: displaying to a user, by a head-mounted display (HMD) device, a plurality of holographic user interface objects overlaid on a real-world view of a 3D physical space in which the user is located, the plurality of holographic user interface objects being capable of being independently manipulated the user; in response to a first user action, causing, by the HMD device, the plurality of holographic user interface objects to appear to the user to be combined into a holographic container object that appears at a first location in the 3D physical space; in response to the first user action or a second action, causing, by the HMD device, the holographic container object to appear to relocate to a second location in the 3D physical space; and causing, by the HMD device, the plurality of holographic user interface objects to appear to the user to deploy from the holographic container object when the holographic container object appears to be located at the second location in the 3D physical space.

2. The method of example 1, wherein the container object is moveable in three dimensions in the 3D physical space.

3. The method of example 1 or example 2, wherein the plurality of user interface objects represent different tools usable by the user to create or edit a holographic target object.

4. The method of any of examples 1 through 3, wherein at least one of the first user action or the second user action comprises a gesture or a spoken command.

5. The method of any of examples 1 through 4, wherein causing the holographic object to appear to relocate to the second location in the 3D physical space is performed automatically in response to the user changing locations within the 3D physical space.

6. The method any of examples 1 through 5, further comprising: maintaining the plurality of holographic user interface objects in a constant orientation relative to the user while the user changes location or orientation within the 3D physical space.

7. The method of any of examples 1 through 6, further comprising: maintaining the plurality of holographic user interface objects at a constant distance or within a constant range of distances from the user while the user changes location within the 3D physical space.

8. The method of any of examples 1 through 7, further comprising: determining locations of physical objects within the 3D physical space; wherein causing the holographic object to appear to relocate to the second location in the 3D physical space comprises at least one of: selecting a display location for the holographic object so as to avoid visual occlusion of the holographic object by a physical or holographic object; or selecting a display location for the holographic object so as to avoid visual occlusion of another holographic object by the holographic object.

9. The method of any of examples 1 through 8, further comprising: determining locations of physical objects in the 3D physical space; and causing the container object to appear attached to a surface of a physical object.

10. The method of any of examples 1 through 9, further comprising: determining locations of physical objects in the 3D physical space; detecting a condition that a holographic object is occluded by a physical object, wherein the holographic object comprises at least one of the plurality of user interface objects or the container object; and in response to detecting the condition, displaying to the user a visual cue to locate the holographic object.

11. A head-mounted display (HMD) device comprising: a head fitting to enable the head-mounted display device to be worn on the head of a user; a display device coupled to the head fitting and disposed to be positioned in front of the eyes of the user when the HMD device is worn by the user, the display device being at least partially transparent; and a processor coupled to the display device and configured to cause the display device to display to the user a plurality of holographic tools overlaid on a real-world view of a 3D physical space in which the user is located, the plurality of holographic tools being capable of being independently moved and operated by the user, each of the tools having a separate predetermined functionality usable by the user in a holographic workspace; in response to a first user action, cause the plurality of holographic tools to appear to the user to be combined into a holographic container object that appears at a first location in the 3D physical space; in response to the first user action or a second user action, cause the holographic container object to appear to relocate to a second location in the 3D physical space; and cause the plurality of holographic tools to appear to the user to deploy from the holographic container object when the holographic container object appears to be located at the second location in the 3D physical space.

12. The HMD device of example 11, wherein the plurality of holographic tools are usable by the user to create or edit a holographic target object.

13. The HMD device of example 11 or example 12, wherein causing the holographic object to appear to relocate to the second location in the 3D physical space is performed automatically in response to the user changing locations within the 3D physical space.

14. The HMD device of any of examples 11 through 13, wherein the processor is further configured to cause the display device to display the plurality of holographic tools in a constant orientation relative to the user while the user changes location or orientation within the 3D physical space.

15. The HMD device of any of examples 11 through 14, wherein the processor is further configured to cause the display device to display the plurality of holographic tools at a constant distance or range of distances from the user while the user changes location within the 3D physical space.

16. A non-transitory machine-readable storage medium storing instructions, an execution of which by a processor causes a head-mounted display (HMD) device to perform operations comprising: displaying, to a user of the HMD device, a plurality of holographic user interface objects overlaid on a real-world view of a 3D physical space in which the user is located, each of the plurality of user interface objects representing a different tool independently usable by the user to create or edit a holographic target object; in response to a first user input from the user, causing the plurality of holographic user interface objects to appear to the user to be combined into a holographic container object that appears at a first location in the 3D physical space, wherein the container object is moveable in three dimensions in the 3D physical space; in response to a second user input from the user indicating a relocation action, causing the holographic container object to appear to relocate to a second location in the 3D physical space; and causing the plurality of holographic user interface objects to appear to the user to deploy from the holographic container object when the holographic container object appears to be located at the second location in the 3D physical space.

17. The non-transitory machine-readable storage medium of example 16, wherein the plurality of holographic tools are usable by the user to create or edit a holographic target object.

18. The non-transitory machine-readable storage medium of example 16 or example 17, wherein causing the holographic object to appear to relocate to the second location in the 3D physical space is performed automatically in response to the user changing locations within the 3D physical space.

19. The non-transitory machine-readable storage medium of any of examples 16 through 18, the operations further comprising: causing the display device to display the plurality of holographic tools in a constant orientation relative to the user while the user changes location or orientation within the 3D physical space.

20. The non-transitory machine-readable storage medium of any of examples 16 through 19, the operations further comprising: causing the display device to display the plurality of holographic tools at a constant distance or range of distances from the user while the user changes location within the 3D physical space.

21. An apparatus comprising: means for displaying, to a user of a display device, a plurality of holographic user interface objects overlaid on a real-world view of a 3D physical space in which the user is located, the plurality of holographic user interface objects being capable of being independently manipulated the user; means for causing, in response to a first user action, the plurality of holographic user interface objects to appear to the user to be combined into a holographic container object that appears at a first location in the 3D physical space; means for causing, in response to the first user action or a second action, the holographic container object to appear to relocate to a second location in the 3D physical space; and means for causing the plurality of holographic user interface objects to appear to the user to deploy from the holographic container object when the holographic container object appears to be located at the second location in the 3D physical space.

22. The apparatus of example 21, wherein the container object is moveable in three dimensions in the 3D physical space.

23. The apparatus of example 21 or example 22, wherein the plurality of user interface objects represent different tools usable by the user to create or edit a holographic target object.

24. The apparatus of any of examples 21 through 23, wherein at least one of the first user action or the second user action comprises a gesture or a spoken command.

25. The apparatus of any of examples 21 through 24, wherein the means for causing the holographic object to appear to relocate to the second location in the 3D physical space causes the holographic object to appear to relocate automatically in response to the user changing locations within the 3D physical space.

26. The apparatus any of examples 21 through 25, further comprising: means for maintaining the plurality of holographic user interface objects in a constant orientation relative to the user while the user changes location or orientation within the 3D physical space.

27. The apparatus of any of examples 21 through 26, further comprising: means for maintaining the plurality of holographic user interface objects at a constant distance or within a constant range of distances from the user while the user changes location within the 3D physical space.

28. The apparatus of any of examples 21 through 27, further comprising: means for determining locations of physical objects within the 3D physical space; wherein causing the holographic object to appear to relocate to the second location in the 3D physical space comprises at least one of: selecting a display location for the holographic object so as to avoid visual occlusion of the holographic object by a physical or holographic object; or selecting a display location for the holographic object so as to avoid visual occlusion of another holographic object by the holographic object.

29. The apparatus of any of examples 21 through 28, further comprising: means for determining locations of physical objects in the 3D physical space; and causing the container object to appear attached to a surface of a physical object.

30. The apparatus of any of examples 21 through 29, further comprising: means for determining locations of physical objects in the 3D physical space; detecting a condition that a holographic object is occluded by a physical object, wherein the holographic object comprises at least one of the plurality of user interface objects or the container object; and in response to detecting the condition, displaying to the user a visual cue to locate the holographic object.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
displaying to a user, by a head-mounted display (HMD) device, a plurality of holographic user interface objects overlaid on a real-world view of a three-dimensional (3D) physical space in which the user is located, wherein each of the holographic user interface objects is a different tool usable by the user to affect a holographic target object, each of the plurality of holographic user interface objects being capable of being independently moved and used by the user;
in response to a first user action, causing, by the HMD device, the plurality of holographic user interface objects to appear to the user to be physically placed into a 3D holographic container object that appears at a first location in the 3D physical space;

in response to the first user action or a second user action, causing, by the HMD device, the 3D holographic container object to appear to relocate to a second location in the 3D physical space; and causing, by the HMD device, the plurality of holographic user interface objects to appear to the user to deploy from within the 3D holographic container object when the 3D holographic container object appears to be located at the second location in the 3D physical space.

2. The method of claim 1, wherein the 3D holographic container object is moveable in three dimensions in the 3D physical space.

3. The method of claim 1, wherein at least one of the first user action or the second user action comprises a gesture or a spoken command.

4. The method of claim 1, wherein causing the 3D holographic object to appear to relocate to the second location in the 3D physical space is performed automatically in response to the user changing locations within the 3D physical space.

5. The method of claim 1, further comprising:
maintaining the plurality of holographic user interface objects in a constant orientation relative to the user while the user changes location or orientation within the 3D physical space.

6. The method of claim 1, further comprising:
maintaining the plurality of holographic user interface objects at a constant distance or within a constant range of distances from the user while the user changes location within the 3D physical space.

7. The method of claim 1, further comprising:
determining locations of physical objects within the 3D physical space;
wherein causing the holographic object to appear to relocate to the second location in the 3D physical space comprises at least one of:
selecting a display location for the holographic object so as to avoid visual occlusion of the holographic object by a physical or holographic object; or
selecting a display location for the holographic object so as to avoid visual occlusion of another holographic object by the holographic object.

8. The method of claim 1, further comprising:
determining locations of physical objects in the 3D physical space; and
causing the 3D holographic container object to appear attached to a surface of a physical object.

9. The method of claim 1, further comprising:
determining locations of physical objects in the 3D physical space;
detecting a condition that a holographic object is occluded by a physical object, wherein the holographic object comprises at least one of the plurality of user interface objects or the 3D holographic container object; and
in response to detecting the condition, displaying to the user a visual cue to locate the holographic object.

10. A head-mounted display (HMD) device comprising:
a head fitting to enable the head-mounted display device to be worn on the head of a user;
a display device coupled to the head fitting and disposed to be positioned in front of the eyes of the user when the HMD device is worn by the user, the display device being at least partially transparent; and
a processor coupled to the display device and configured to cause the display device to display to the user a plurality of holographic tools overlaid on a real-world view of a three-dimensional (3D) physical space in which the user is located, wherein each of the holographic tools is usable by the user to affect a holographic target object, each of the plurality of holographic tools being capable of being independently moved and operated by the user, each of the tools having a separate predetermined functionality usable by the user in a holographic workspace;

in response to a first user action, cause the plurality of holographic tools to appear to the user to be physically placed into a 3D holographic container object that appears at a first location in the 3D physical space;

in response to the first user action or a second user action, cause the 3D holographic container object to appear to relocate to a second location in the 3D physical space; and cause the plurality of holographic tools to appear to the user to deploy from within the 3D holographic container object when the 3D holographic container object appears to be located at the second location in the 3D physical space.

11. The HMD device of claim 10, wherein causing the holographic object to appear to relocate to the second location in the 3D physical space is performed automatically in response to the user changing locations within the 3D physical space.

12. The HMD device of claim 10, wherein the processor is further configured to cause the display device to display the plurality of holographic tools in a constant orientation relative to the user while the user changes location or orientation within the 3D physical space.

13. The HMD device of claim 10, wherein the processor is further configured to cause the display device to display the plurality of holographic tools at a constant distance or range of distances from the user while the user changes location within the 3D physical space.

14. A non-transitory machine-readable storage medium storing instructions, an execution of which by a processor causes a head-mounted display (HMD) device to perform operations comprising:
displaying, to a user of the HMD device, a plurality of holographic user interface objects overlaid on a real-world view of a three-dimensional (3D) physical space in which the user is located, each of the plurality of holographic user interface objects being a different tool independently movable and usable by the user to create or edit a holographic target object;

in response to a first user input from the user, causing the plurality of holographic user interface objects to appear to the user to be physically placed into a 3D holographic container object that appears at a first location in the 3D physical space, wherein the 3D holographic container object is moveable in three dimensions in the 3D physical space;

in response to a second user input from the user indicating a relocation action, causing the 3D holographic container object to appear to relocate to a second location in the 3D physical space; and causing the plurality of holographic user interface objects to appear to the user to deploy from within the 3D holographic container object when the 3D holographic container object appears to be located at the second location in the 3D physical space.

15. The non-transitory machine-readable storage medium of claim 14, wherein causing the holographic object to appear to relocate to the second location in the 3D physical space is performed automatically in response to the user changing locations within the 3D physical space.

16. The non-transitory machine-readable storage medium of claim 14, the operations further comprising:
   causing the display device to display the plurality of holographic tools in a constant orientation relative to the user while the user changes location or orientation within the 3D physical space.

17. The non-transitory machine-readable storage medium of claim 14, the operations further comprising:
   causing the display device to display the plurality of holographic tools at a constant distance or range of distances from the user while the user changes location within the 3D physical space.

* * * * *